UNITED STATES PATENT OFFICE.

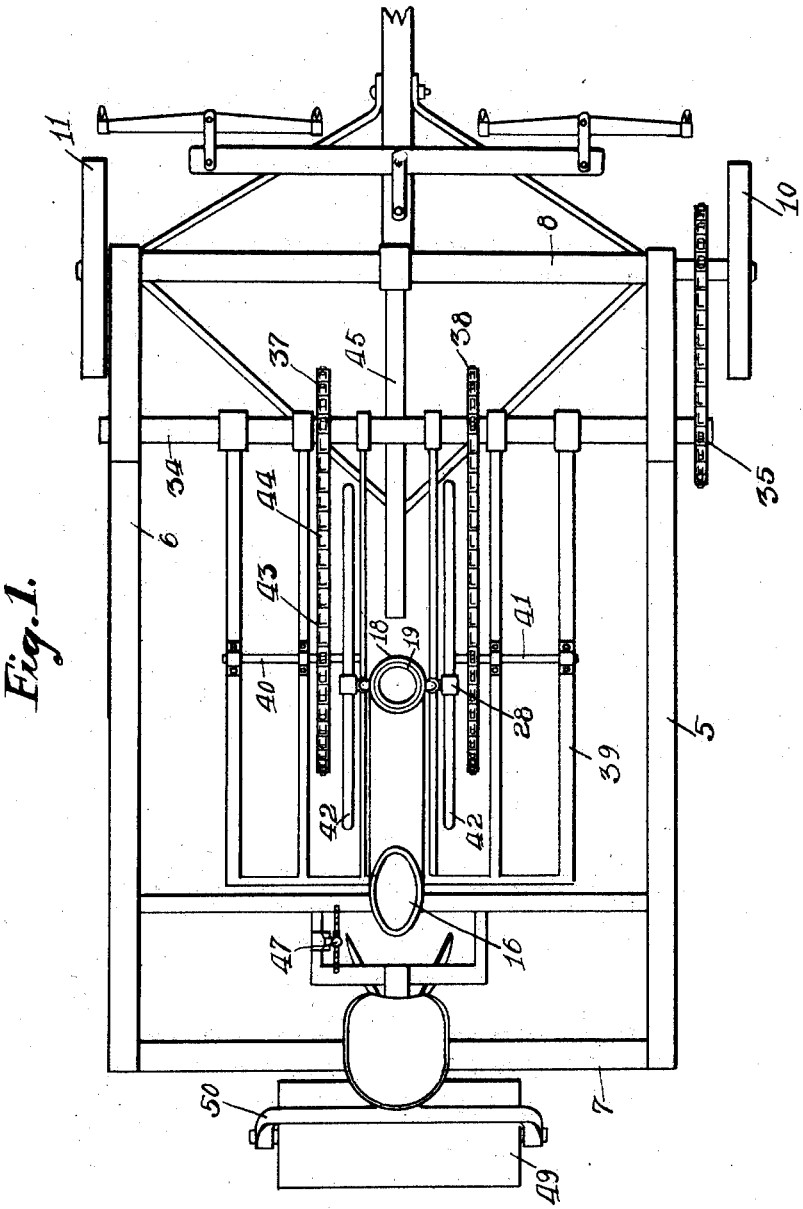

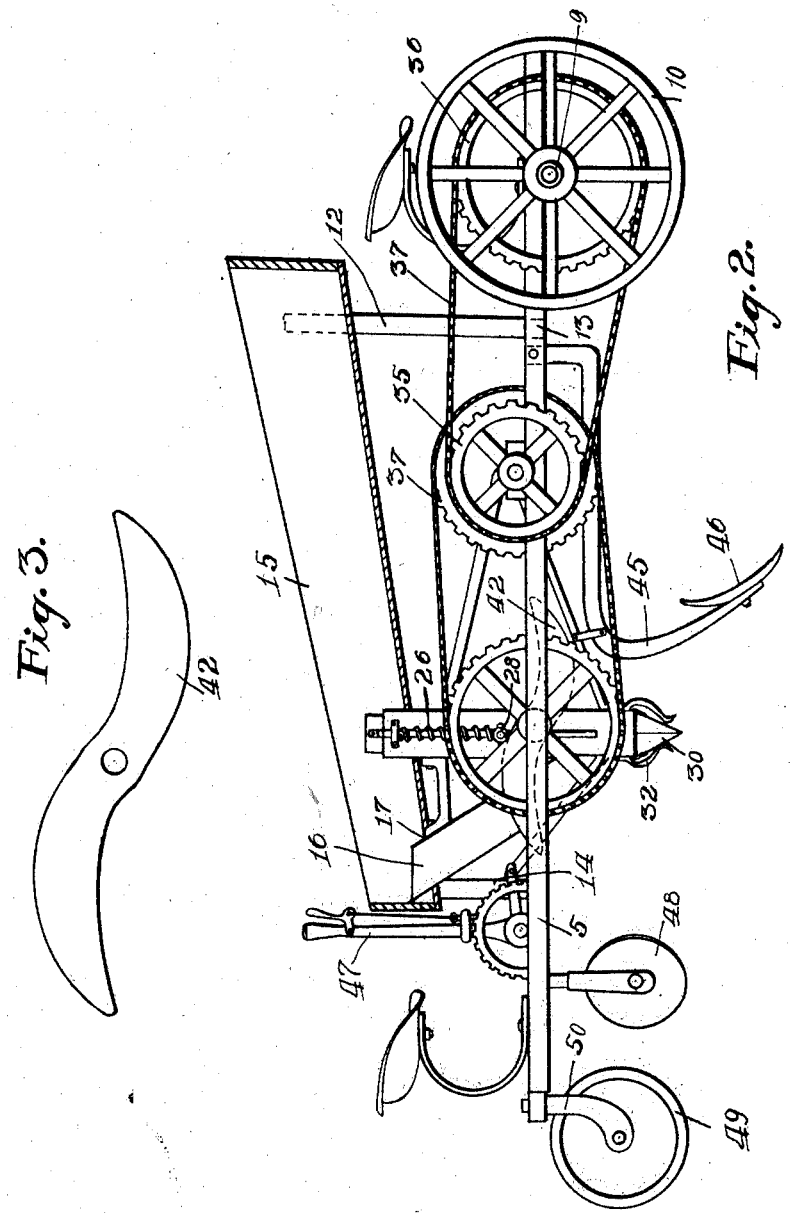

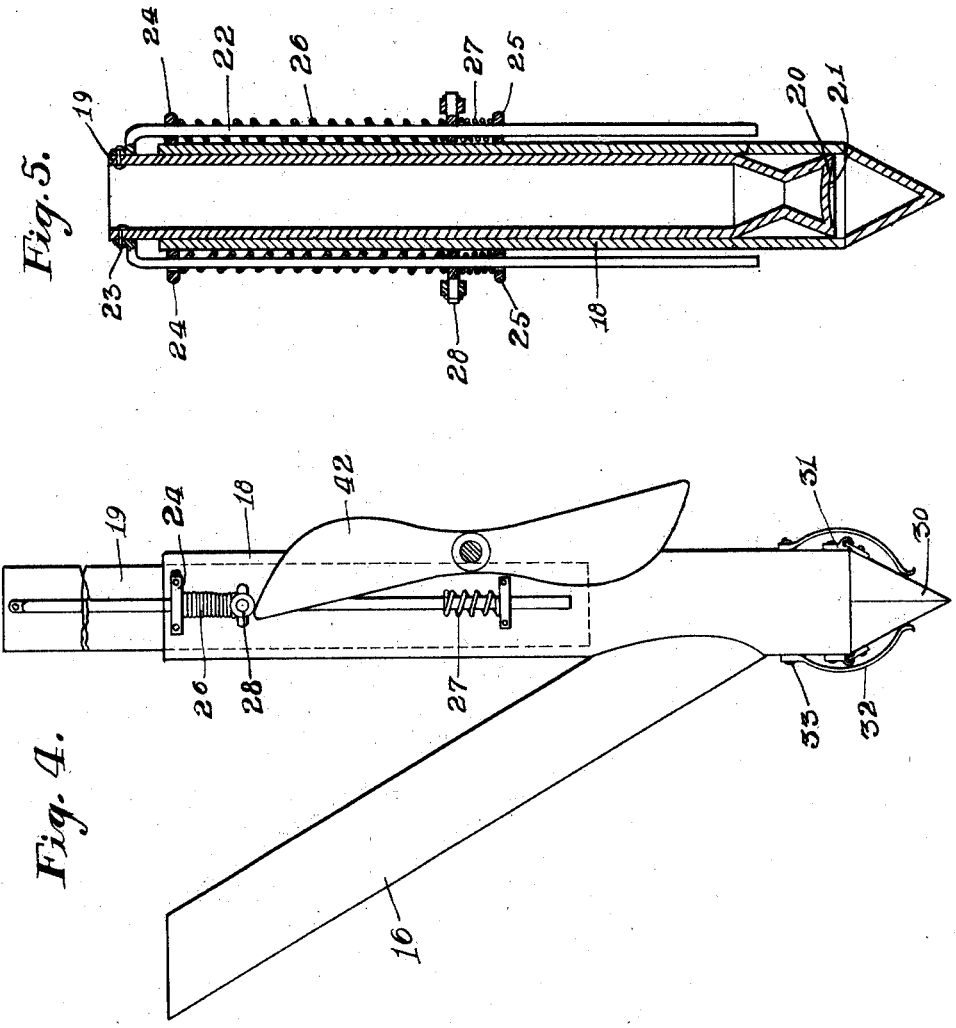

JOHN D. SAMUELS AND HARRY E. BATES, OF IDAHO FALLS, IDAHO.

SEED-BEET PLANTER.

1,396,784.  Specification of Letters Patent.  Patented Nov. 15, 1921.

Application filed February 24, 1920. Serial No. 360,589.

*To all whom it may concern:*

Be it known that we, JOHN D. SAMUELS and HARRY E. BATES, citizens of the United States, residing at Idaho Falls, in the county of Bonneville, State of Idaho, have invented a new and useful Seed-Beet Planter, of which the following is a specification.

This invention relates to new and useful improvements in seeders and planters, and more particularly to a machine especially adapted for planting seed beets.

The primary object of the invention is to provide a machine of this character which will rapidly and automatically plant seed beets, in a proper growing position, thus avoiding hand planting, and reducing the time consumed in planting seed beets, to a minimum.

A further object of the invention is to provide a seed planting machine, including a planting tube and means operating in conjunction with a planting tube, for forcing a seed beet therefrom, to properly position the same in the ground surface.

A further object of the invention is to provide a device of this character which will efficiently cover the beets, and roll the ground surface after the beets have been planted, thus completing the planting operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a top plan view of a machine constructed in accordance with the present invention.

Fig. 2 illustrates a side elevational view of the same.

Fig. 3 illustrates a detail view of the double ended cam employed in operating the planting plunger.

Fig. 4 illustrates a side elevational view of the planting tube, and

Fig. 5 illustrates a longitudinal sectional view of the same.

Referring to the drawings in detail, the frame of the machine includes the side bars 5 and 6, and end bars 7 and 8, the end bar 8, supporting suitable bearings, in which the axle 9, operates, the axle 9, forming a support for the bull wheels 10 and 11, supported on opposite ends thereof and keyed thereto, to move therewith.

An auxiliary supporting frame 12, has its forward portion secured to the forward portion of the main frame of the machine, as at 13, its rear portion being disposed adjacent the rear of the machine, as at 14, the forward portion of the frame extending upwardly, a greater distance than the rear portion thereof, so that the beet trough, supported thereby, is supported at an angle with relation to the main frame, the same being inclined toward the rear of the machine, and toward the beet feeding tube, to be hereinafter more fully described.

This beet trough 15, is relatively wide, the front end wall thereof being wider than the rear wall, so that the greater quantity of beets supported in the trough 15, will be contained in the upper end thereof, and out of the way of the feeding tube 16, which extends through an opening 17, formed in the bottom of the beet trough 15, adjacent the rear end thereof.

The delivering tube 16, extends at an angle with relation to the frame, and trough 15, and has communication with the plunger tube 18, as at 19, or at a point adjacent the lower end of the plunger tube 18, so that beets fed through the feeding tube 16, will pass into the plunger tube 18 adjacent the lower end thereof, whereby the same will be forced from the feeding tube, by suitable means, and deposited, or planted in a proper growing position, in the ground over which the machine is moving.

Within the plunger tube 18, is slidably mounted the plunger 19, which is preferably of a diameter slightly less than the diameter of the plunger tube 18, and includes the head 20, which is curved as at 21, to conform with the curvature of the upper end, of the usual seed beet, so that the same will engage the beets under operation in a manner which will not cause the beets to become bruised, or cut, during the planting operation.

Depending guide rods 22, have their upper ends secured to the upper end of the plunger 19, as at 23, the same passing through the guide ways 24, and 25, disposed on opposite sides of the plunger tube 18, and in spaced relation with each other, to provide abutments, for the coiled springs 26 and 27; the coiled springs 26, as shown, have their upper ends contacting with the under sides of the respective guide ways 24, the lower end thereof contacting with the movable cam engaging lugs 28, which are apertured as at 29, to accommodate the guide rods 22, so that the cam engaging lugs 28, may be secured to the guide rods 22 as at 22′ and moved against the tension of the coiled springs 26, the cam engaging lugs 28 being restricted in their movement in the opposite direction, by the coiled springs 27, which are disposed between the under side of the cam engaging lugs 28, and the upper surface of the guide ways 25.

Pivotally secured to the lower end of the plunger tube 18, are the opposed jaws 30, secured to the plunger tube 18, as at 31, and held normally closed, by the leaf springs 32, having connection with the plunger tube 18, as at 33, the lower ends thereof being curved outwardly and contacting with the jaws 30, for exerting pressure on the same to hold the jaws in a closed position, as indicated by Fig. 4 of the drawings.

The shaft 34, has its ends supported in suitable bearings provided on the main frame of the machine, and supports the gear wheel 35, on one end thereof, which gear wheel 35 receives rotary motion from the gear wheel 36, through the medium of the chain 37, operating over the gear wheels 35 and 36. It will thus be seen that due to the connection between the gear wheels 35 and 36, the shaft 34 is rotated, which in turn causes the rotation of the gear wheels 37 and 38, keyed or otherwise secured to the shaft 34, to move therewith.

A supplementary frame 39, is also supported by the main frame, and provides means for supporting the stub shafts 40 and 41, each of which carries a double ended cam 42, the construction thereof being clearly shown by Fig. 3 of the drawings, and which cams, are disposed to operate on opposite sides of the plunger tube 18, and in a position to engage the cam engaging lugs 28, to move the same upwardly against the tension of the coiled springs 26, whereupon after the cams 42 have moved to disengage the cam engaging lugs 28, the plunger moves downwardly, through the plunger tube 18, under the tension of the springs 26, with the result that a beet which is deposited in the plunger tube 18, by the tube 16, is forced through the jaws 30, which move open, under the pressure of the beet passing therethrough; the beet then drops into the ground surface, to be planted.

The shafts 40 and 41 receive rotary motion from the shaft 34, through the medium of the sprocket wheels 43 mounted on the shafts 40 and 41, the sprocket wheels 43 having connection with the gear wheels 37 and 38, through the chains 44.

Supported by the main frame of the machine, is the plow beam 45, carrying the plow 46, on one end thereof, which plow is located in front of the plunger tube 18, so that the same will form a furrow, when the machine is moved along a field, and the controlling lever 47, has been moved to permit the plow 46 to properly engage the ground surface.

Directly behind the plunger tube 18, are the covering disks 48, which are disposed at angles with relation to each other, so that the same will contact with the earth at the edges of the furrow, for throwing the earth inwardly to cover the furrow. After the seed beets have been planted, the roller 49, which as shown, is relatively wide and supported by the arms 50, pivotally connected to the rear of the machine, rolls the earth which has been thrown into the furrow, whereupon the earth is packed around the seed beets, in such a way that the beets will not be washed from the soil, as a result of heavy rains.

In the operation of the device, the trough 15 is filled with seed beets, and an operator is seated at the rear of the machine, so that he has access to the beets in the trough 15, to enable the operator to position beets in the delivering tube 16, with the rooted ends thereof pointing downwardly. The machine is now moved over the ground surface to be planted, with the result that the plow 46 forms a furrow, in front of the delivering tube 16 and plunger tube 18.

Rotary motion is imparted to the cam member 42, as before described, which camming members move into contact with the cam engaging lugs 28, which move the lugs, together with the guide rods 22, upwardly, and when the cam members 42 have reached a predetermined position, or a position where the same disengage the cam engaging lugs 28, the plunger 19, moves downwardly to engage the beet which has now entered the plunger tube 18. It follows that the beet is forced from the plunger tube 18, under the pressure of the plunger 19, and into the ground.

The earth is covered over the beets, by the disks 48, and is finally rolled by the roller 49, all of the elements of which are carried by the main frame of the machine. It might be further stated that the machine may be moved over the field under cultivation by any suitable means, such as tractors or horse plows now in use, suitable connections of course being made at the forward portion of the machine.

Having thus described the invention, what is claimed is:—

In a seed beet planting machine, an inclined beet trough supported by the frame, a delivering tube in communication with the beet trough at the lower extremity thereof, a plunger tube in communication with the delivering tube, a plunger operating in the plunger tube, guide rods having connections with the plunger at the upper end thereof, guideways on the plunger tube adjacent to the upper end thereof, guideways on the plunger tube at a point intermediate its ends, lugs carried by the rods, said lugs supporting rollers, coiled springs positioned on the rods between the lugs and guideways at the upper end of the tube, and relatively small coiled spring members disposed between the lugs and guideways supported intermediate the ends of the plunger tube, and means for moving the plunger in one direction.

In testimony that we claim the foregoing as our own, we have hereto affixed our signatures in the presence of two witnesses.

JOHN D. SAMUELS.
HARRY EDWARD BATES.

Witnesses:
GENE BATES,
RICHARD DE V. BESSAC.